UNITED STATES PATENT OFFICE.

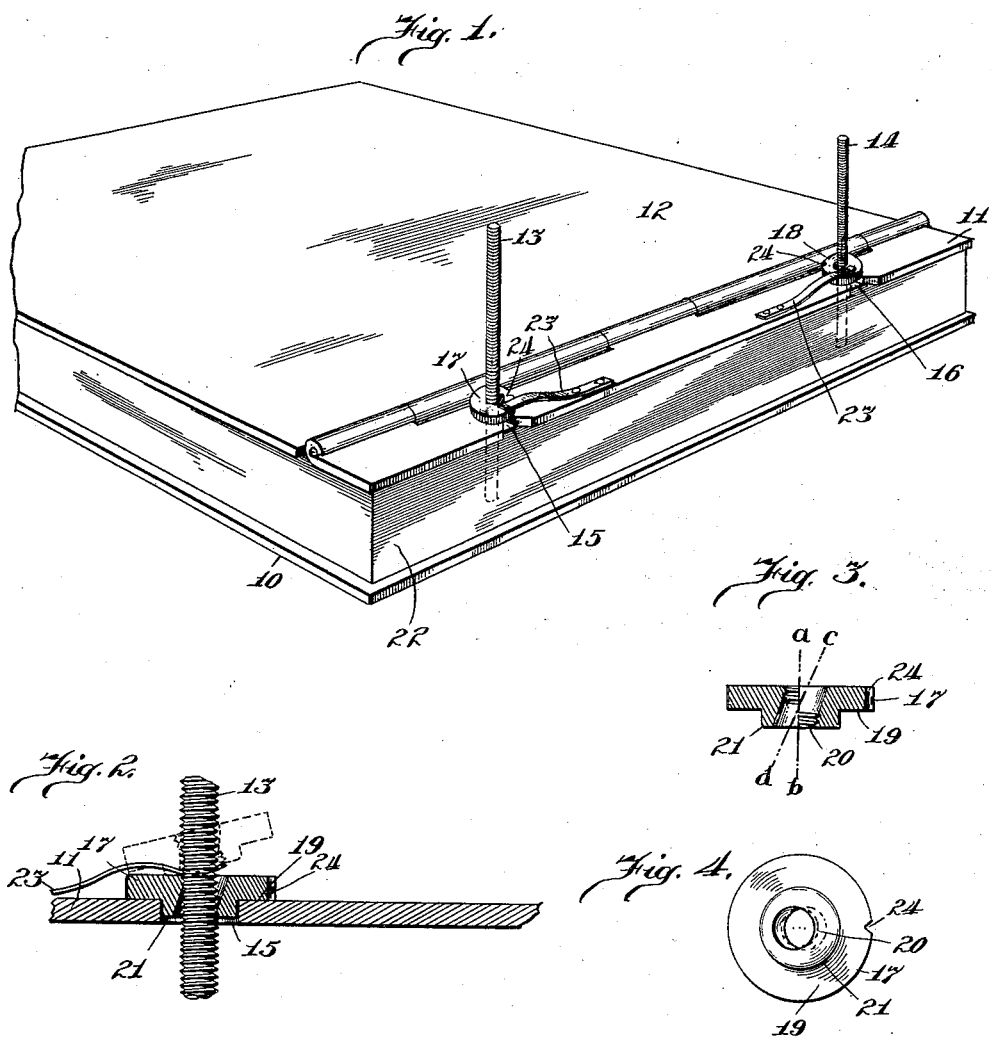

THOMAS E. HEETER, OF ST. LOUIS, MISSOURI, ASSIGNOR TO THE BOORUM & PEASE LOOSE LEAF BOOK COMPANY, A CORPORATION OF MISSOURI.

FILE-BINDER.

1,008,145.   Specification of Letters Patent.   Patented Nov. 7, 1911.

Application filed July 1, 1911. Serial No. 636,526.

*To all whom it may concern:*

Be it known that I, THOMAS E. HEETER, a citizen of the United States, and resident of the city of St. Louis and State of Missouri, have invented certain new and useful Improvements in File-Binders, of which the following is a specification, and which are illustrated in the accompanying drawings, forming a part thereof.

The invention relates to that type of binders for loose leaves which comprises a base plate from which filing posts rise, and a follower or clamping plate running on the posts with means for locking such plate to to the posts.

The object of the invention is to provide improved means for locking the follower or clamping plate and it consists broadly in a device of the kind named in which the posts are threaded, nuts being applied to the posts and being normally loose to slide thereon but being brought into threaded engagement with the posts when forced down upon the plate; together with further details as hereinafter fully pointed out.

The invention is illustrated in the accompanying drawings, in which—

Figure 1 is a detail perspective of a file binder embodying the invention, some of the parts being broken away; Fig. 2 is a sectional detail through the follower and one of the nuts and showing a portion of the post in elevation, the nut being shown in two positions; Fig. 3 is a transverse section of the nut, and Fig. 4 is a bottom plan view thereof.

Aside from the character of the locking means, the binder may take any desired form. As shown, it comprises a base plate 10, a follower or clamping plate 11 and a cover plate 12 hinged to the follower. A pair of threaded posts 13, 14 rise vertically from the base plate 10, passing through apertures in the follower and preferably these apertures are in the form of recesses or slots 15, 16 entering from the rear edge of the follower. These apertures are sufficiently wide to permit the follower to slide freely upon the posts and in the preferred form of construction are of such width as to permit the entry of a short stem formed upon the nut.

The nuts 17, 18 running upon the posts being identical in form but one need be described. As shown most plainly in Fig. 3 the nut 17 is provided with an aperture having two axes, the one indicated by the line *a—b* being perpendicular to the lower face 19 of the nut and the other indicated by the line *c—d* being oblique thereto. The bore of the nut of which the axes is designated *a—b* is threaded and is of such diameter that the threads 20 engage the threads of the post. The bore of the nut of which the axes is designated *c—d* is slightly greater in diameter than the extreme diameter of the post and is without threads. Preferably the nut is formed with a short downwardly projecting stem 21 which makes a snug fit within the apertures 15, 16 of the follower 11. When the nut is forced down against the follower 11 it is brought into line with the post 13, both by contact of its flattened face 19 with the upper face of the follower and by the engagement of its stem 21 with the walls of the apertures 15 thus bringing its threads 20 into engagement with the threads of the post. The nut may now be screwed down upon the post to securely clamp the follower to the contents 22 of the binder. When the nut is turned backward it tends to assume the oblique position shown in dotted lines in Fig. 2 its threads being then disengaged from the threads of the post thus permitting it to slide freely upon the post.

If desired, a leaf spring 23 may be secured to the upper face of the follower 11 by rivets or other suitable means, its free end bearing downwardly upon the nut 17 at one side of the post. When the nut is turned back upon the post, the follower being forcibly held down by the hand of the user this spring tilts the nut to the dotted lines position whereupon the follower may be freely raised, the nuts traveling with it.

The body of the nuts may take any preferred form. As shown, they are round and knurled at the edge for convenience of manipulation. They may, however, be made polygonal or be provided with wings or finger pieces. These forms of construction being common it is not deemed necessary to illustrate them.

For convenience a mark, such as the notch 24, may be placed upon the nut to plainly indicate the smooth portion of its aperture.

I claim as my invention—

1. In combination, a base plate, threaded posts projecting upwardly from the base plate, a follower running on the posts, and nuts running on the posts, each nut being partially threaded, the bore of the nuts being enlarged at opposite sides and opposite ends, the walls of such enlarged portions being plane.

2. In combination, a base plate, threaded posts projecting upwardly from the base plate, a follower running on the posts, and nuts running on the posts, each nut having a flat face for engaging the follower and being partially threaded, the bore of the nuts being enlarged at opposite sides and opposite ends, the walls of such enlarged portions being plane.

3. In combination, a base plate, threaded posts projecting upwardly from the base plate, a follower running on the posts, and nuts running on the posts, each nut having a stern for entering the post aperture of the follower and being partially threaded, the bore of the nuts being enlarged at opposite sides and opposite ends, the walls of such enlarged portions being plane.

4. In combination, a base plate, threaded posts projecting upwardly from the base plate, a follower running on the posts, nuts running on the posts, each nut being partially threaded, the bore of the nuts being enlarged at opposite sides and opposite ends, the walls of such enlarged portions being plane, and springs attached to the follower and bearing downwardly on each nut at one side of the post upon which it is mounted.

THOMAS E. HEETER.

Witnesses:
WARREN S. SCHOONMAKER,
GEO. B. GANNETT.

Copies of this patent may be obtained for five cents each, by addressing the "Commissioner of Patents, Washington, D. C."